United States Patent [19]

Chen et al.

[11] Patent Number: 5,030,604

[45] Date of Patent: Jul. 9, 1991

[54] PREPARATION METHOD FOR PB[($ZN_xMG_{1-x}$)$_{\frac{1}{3}}NB_{\frac{2}{3}}$]$O_3$ CERAMICS

[75] Inventors: San Y. Chen, Kaoshiung; Syn Y. Cheng, Taichung, both of Taiwan

[73] Assignee: Industrial Technology Research Institute, Taiwan

[21] Appl. No.: 428,126

[22] Filed: Oct. 27, 1989

[51] Int. Cl.$^5$ .............................................. C04B 35/00
[52] U.S. Cl. ..................................... 501/135; 501/134
[58] Field of Search ................ 428/172; 501/134, 135, 501/136

[56] References Cited

U.S. PATENT DOCUMENTS

| | | | |
|---|---|---|---|
| 4,265,668 | 8/1981 | Fujiwara et al. | 501/134 |
| 4,339,544 | 7/1982 | Sakabe et al. | 501/134 |
| 4,637,989 | 1/1987 | Ling et al. | 501/134 |
| 4,712,156 | 12/1987 | Bardhan | 501/135 |
| 4,753,905 | 6/1988 | Nishioka et al. | 501/134 |
| 4,812,426 | 3/1989 | Takagai et al. | 501/136 |

OTHER PUBLICATIONS

Chem. Abstract-Japanese Patent 57-25607 Murata 2/10/82, "Dielectric Ceramic Compsn-Formed from Lead, Mg, Nb & Zn Oxides".

Halliyal et al., Am. Ceram. Soc. Bull., 66 [4] 671-71 (1987).

Yokomizo et al., J. Phys. Soc. Japan, 28 [5] 1278-84 (1970).

Primary Examiner—William R. Dixon, Jr.
Assistant Examiner—Paul Marcantoni
Attorney, Agent, or Firm—Scully, Scott, Murphy & Presser

[57] ABSTRACT

A preparation method for Pb[($Zn_xMg_{x-1}$)$_{\frac{1}{3}}Nb_{2/3}$]$O_3$ ceramic, wherein $1 < x = 0.25$, without the use of stabilizers such as $SrTiO_3$, $PbTiO_3$, $BaTiO_3$, or $PbZrO_3$. The method comprises the steps of:

(a) mixing about 14.0 wt % of MgO with 86.0 wt % of $Nb_2O_5$, (b) calcining the mixture in step (a) at a temperature about 1000° C. for 4 hours, (c) reacting about 68.6 wt % PbO with the calcined product obtained in step (b), and (d) mixing about 10.2-49.8 wt % PbO, about 1.2-6.0 wt % ZnO, and about 4.0-19.8 wt % $Nb_2O_5$ with product of about 84.4-24.2 wt % PMN and carrying out the steps of grinding, drying and calcining at temperatures 850° C. to 950° C. for about 4 hours, (e) sintering at temperatures of from 950° C.-1200° C. for 2 hours.

6 Claims, 7 Drawing Sheets

□ ZnO=0.15   + ZnO=0.35   ◇ ZnO=0.50   △ ZnO=0.65   × ZnO=0.75   ▽ ZnO=0.85

PREPARATION METHOD FOR PB[(ZN$_x$MG$_{1-x}$)$_{\frac{1}{3}}$NB$_{\frac{2}{3}}$]O$_3$ CERAMICS

BACKGROUND OF THE INVENTION

Pb(Zn$_{\frac{1}{3}}$Nb$_{\frac{2}{3}}$)O$_3$ (abbreviated as PZN) ceramic and Pb(Mg$_{\frac{1}{3}}$Nb$_{\frac{2}{3}}$)O$_3$ (abbreviated as PMN) ceramic are regarded as important raw materials in making of ceramic drivers and integrated layered capacitors mainly due to their high coefficients of electrostrictive and dielectric constants. However, only when PZN and PMN possess the structure of perovskite, then both of them possess the above properties and usefulness. Moreover, in the process of making these ceramics, it is very often that pyrochlore phase will occur which deteriorates these properties. Recently, the synthesis of PMN ceramic can be obtained by first pre-synthesizing the MgNb$_2$O$_6$ phase and then reacting with PbO in order to form perovskite phase of PMN. While in the synthesis of PZN ceramic, even the ZnNb$_2$O$_6$ phase is formed first, the perovskite phase cannot be fully obtained. As a result, common stabilizers such as SrTiO$_3$, PbTiO$_3$, BaTiO$_3$, Ba(Zn$_{\frac{1}{3}}$Nb$_{\frac{2}{3}}$)O$_3$ or PbZrO$_3$, etc. have to be added to facilitate the formation of PZN perovskite. The above additives can be used to stabilize the PZN perovskite but they may cause unfavorable influence on the inherent excellent properties of PZN. In light of the fact that the PMN perovskite ceramic possesses the properties similar to the PZN, it is advisable to synthesize the stable PMN perovskite first and then stabilize the PZN perovskite phase ceramic by employing the synthesized PMN as the additive, and form the Pb(Zn$_x$Mg$_{1-x}$)$_{\frac{1}{3}}$Nb$_{\frac{2}{3}}$]O$_3$ perovskite phase ceramic raw materials. According to the preparation method of the present invention, no addition of additive as stabilizer is needed to effect the process. In conventional method of ceramics preparation with PZN as the basis, components such as PbO, ZnO, and Nb$_2$O$_5$ are mixed together without the addition of perovskite phase stabilizer (such as SrTiO$_3$, PbTiO$_3$, BaTiO$_3$), as a result, the perovskite phase PZN as indicated in FIG. 1 cannot be obtained. Consequently, the addition of a stabilizer is necessary. Furthermore, in the process of making the desired product with an appropriate ratio of PbO, ZnO, MgO and Nb$_2$O$_5$, the amount of MgO should be greater than 35 mole %. By this process, about 80% of perovskite phase can be obtained. The properties of the obtained product has been illustrated in FIG. 4. It seems that the coefficient of dielectric constant does not exceed 13000.

Japanese Patent 57-25607 discloses a dielectric ceramic composition consisting 68.03–69.07wt % Pb$_3$O$_4$, 2.43 to 3.98 wt % MgO, 0.15 to 3.15 wt % ZnO and 26.37 to 26.78 wt % Nb$_2$O$_5$. Pb$_3$O$_4$, MgO and Nb$_2$O$_5$ are mixed and sintered at 850° C. to produce Pb(Mg$_{\frac{1}{3}}$Nb$_{\frac{2}{3}}$)O$_3$. Powered Pb$_3$O$_4$, ZnO and Nb$_2$O$_5$ were mixed and sintered at 850° C. to produce Pb(Zn$_{\frac{1}{3}}$Nb$_{\frac{2}{3}}$)O$_3$. 75 parts wt of Pb(Mg$_{\frac{1}{3}}$Nb$_{\frac{2}{3}}$)O$_3$, 25 part wt. of Pb(Zn$_{\frac{1}{3}}$Nd$_{\frac{2}{3}}$)O$_3$ and a vinyl acetate binder are mixed and compacted, and sintered at 1050° C. for 1 hr. The sintered product has a dielectric constant of 14000 at 25° C.

SUMMARY OF THE INVENTION

Therefore, it is the object of the present invention to provide a preparation method in producing stable Pb[(Zn$_x$Mg$_{1-x}$)$_{\frac{1}{3}}$Nb$_{\frac{2}{3}}$]O$_3$ ceramic by first synthesizing a stable PMN ceramic perovskite phase and then making use of this produced material as a stabilizer for the perovskite phase of the Pb(Zn$_{\frac{1}{3}}$Nb$_{\frac{2}{3}}$)O$_3$, and finally a Pb[(Zn$_x$Mg$_{1-x}$)$_{\frac{1}{3}}$Nb$_{\frac{2}{3}}$]O$_3$ ceramic having perovskite phase is thus obtained. The produced ceramic possesses excellent properties in industrial application.

It is another object of the present invention to provide a preparation method in producing a stable Pb[(Zn$_x$Mg$_{1-x}$)$_{\frac{1}{3}}$Nb$_{\frac{2}{3}}$])$_3$ ceramic without the addition of a further stabilizer such as SrTiO$_3$, BaTiO$_3$, etc..

It is a further object of the present invention to provide a preparation method in producing a stable Pb[(Zn$_x$Mg$_{1-x}$)$_{\frac{1}{3}}$Nb$_{\frac{2}{3}}$]O$_3$ ceramic, wherein the obtained ceramic is non-degradable and possesses high coefficient of electrostrictive friction and dielectric constant.

These and other objects will become readily apparent from the detailed description which follows.

BRIEF DESCRIPTION OF THE DRAWINGS

In the accompanying drawings.

DETAILED DESCRIPTION OF THE INVENTION

The present invention relates to a preparation method of Pb[(Mg$_{1-x}$Nb$_x$)$_{\frac{1}{3}}$]O$_3$ ceramic materials with stable perovskite structure by utilizing a stable PMN ceramic as the stabilizer.

In this process, about 13.736 wt % of MgO and about 86.264 wt % of Nb$_2$O$_5$ are mixed, ground and calcined to form MgNb$_2$O$_6$. The calcining process is carried out at 1000° C. for approximately 4 hours to produce MgNb$_2$O$_6$. PbO is added to the above MgNb$_2$O$_6$ and the grinding and calcining steps are repeated. It is calcined at 900° C. for 4 hours to obtain the perovskite phase of Pb(Mg$_{\frac{1}{3}}$Nb$_{\frac{2}{3}}$)O$_3$. PbO, ZnO, and Nb$_2$O$_5$ are then mixed and ground with the obtained Pb(Mg$_{\frac{1}{3}}$Nb$_{\frac{2}{3}}$)O$_3$ ground. Having the above product dried and then calcined at temperature range from 850° C. to 950° C. for 4 hours. The obtained product is again ground and sintered at temperatures of 950° C. to 1200° C. for another 2 hours. The final product obtained is Pb—Mg—Zn—Nb$_2$O$_5$ ceramic.

Figure 1:
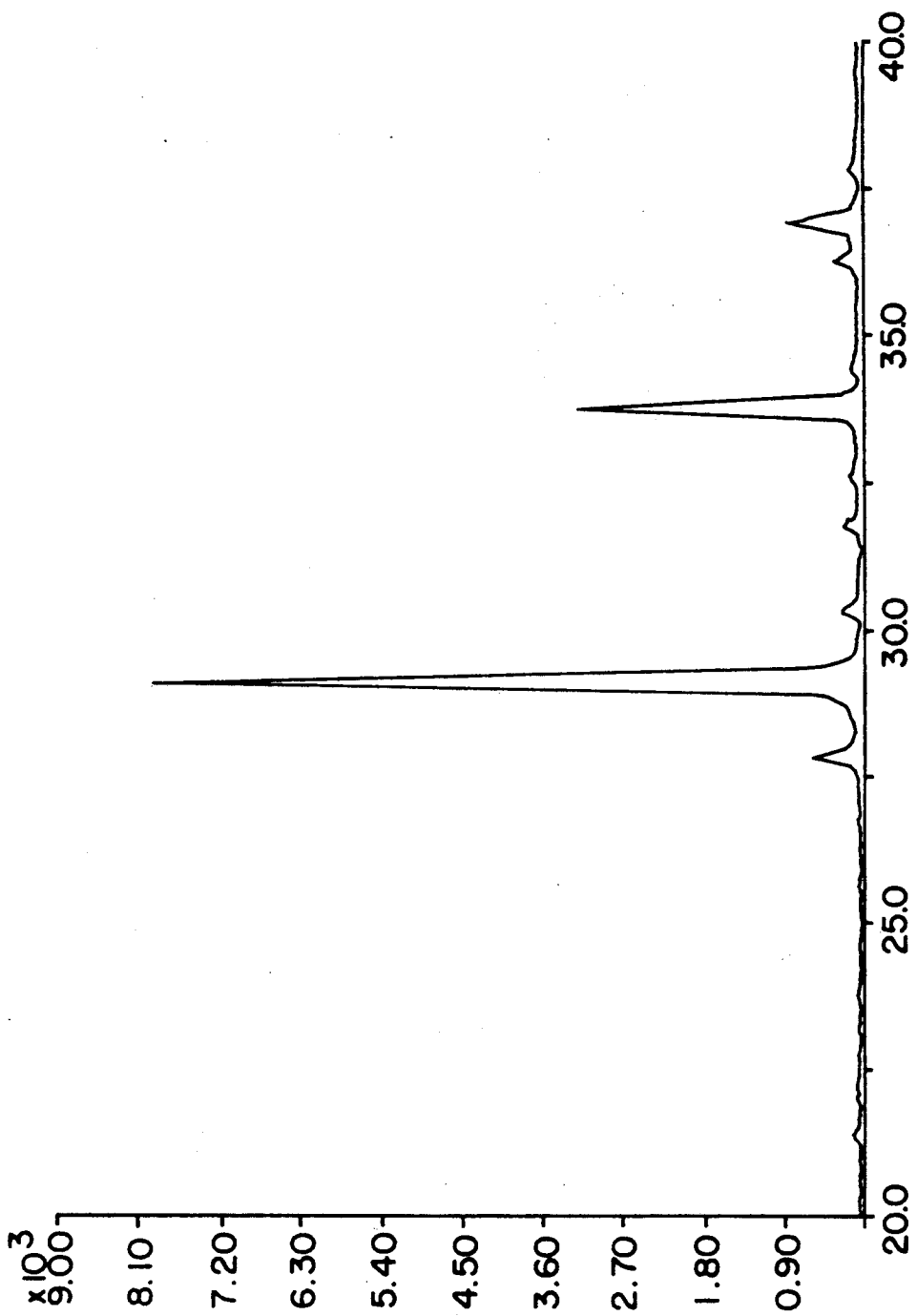
FIG. 1 illustrates the X-ray diagram of the PbO—ZnO—Nb$_2$O$_5$ ceramic without the addition of perovskite phase stabilizer in a conventional method.
Figure 2:
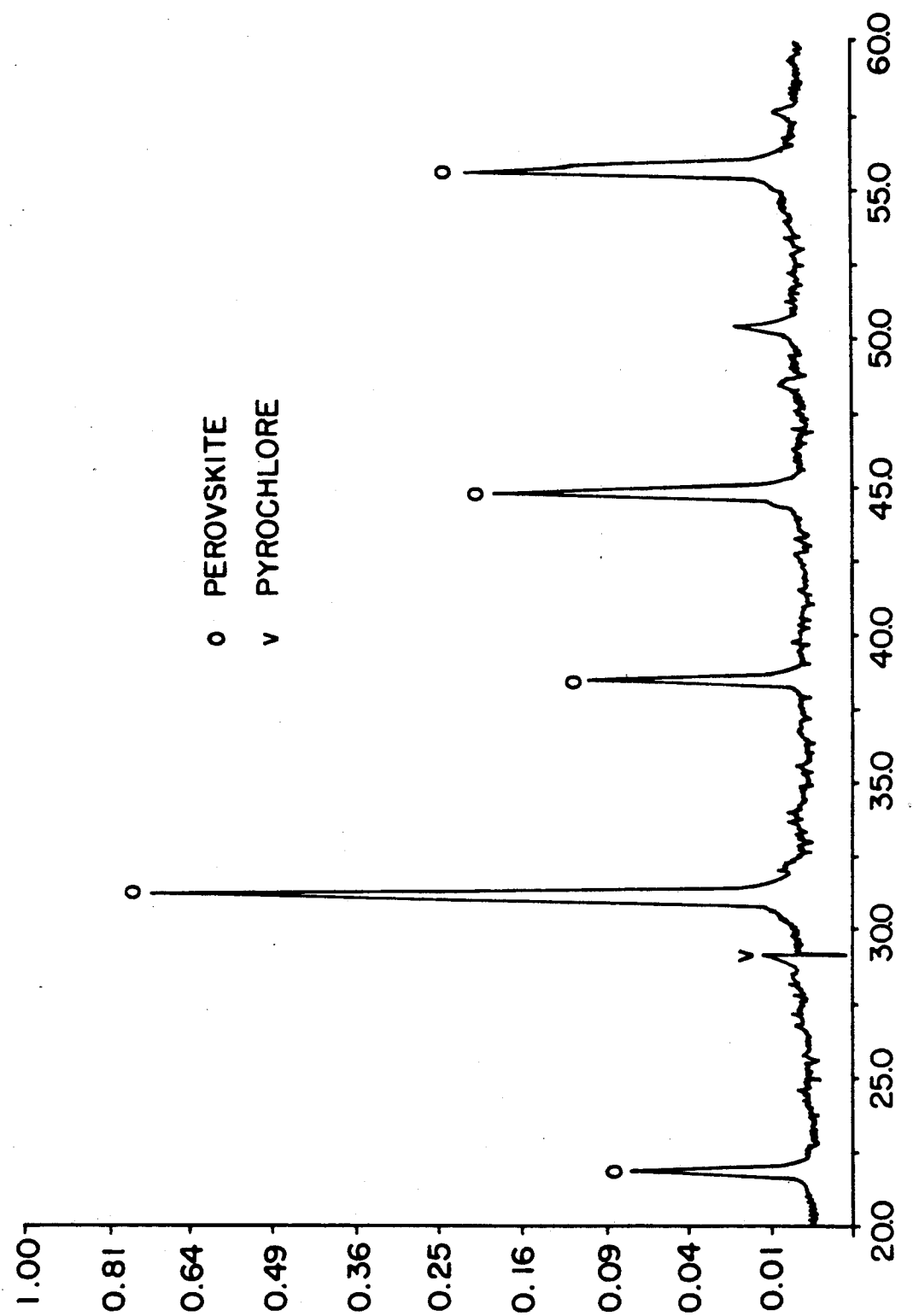
FIG. 2 illustrates the X-ray diagram of the PbO—ZnO—Nb$_2$O$_5$ ceramics with the addition of 0.12 mol % SrTiO$_3$ in a conventional method.
Figure 3:
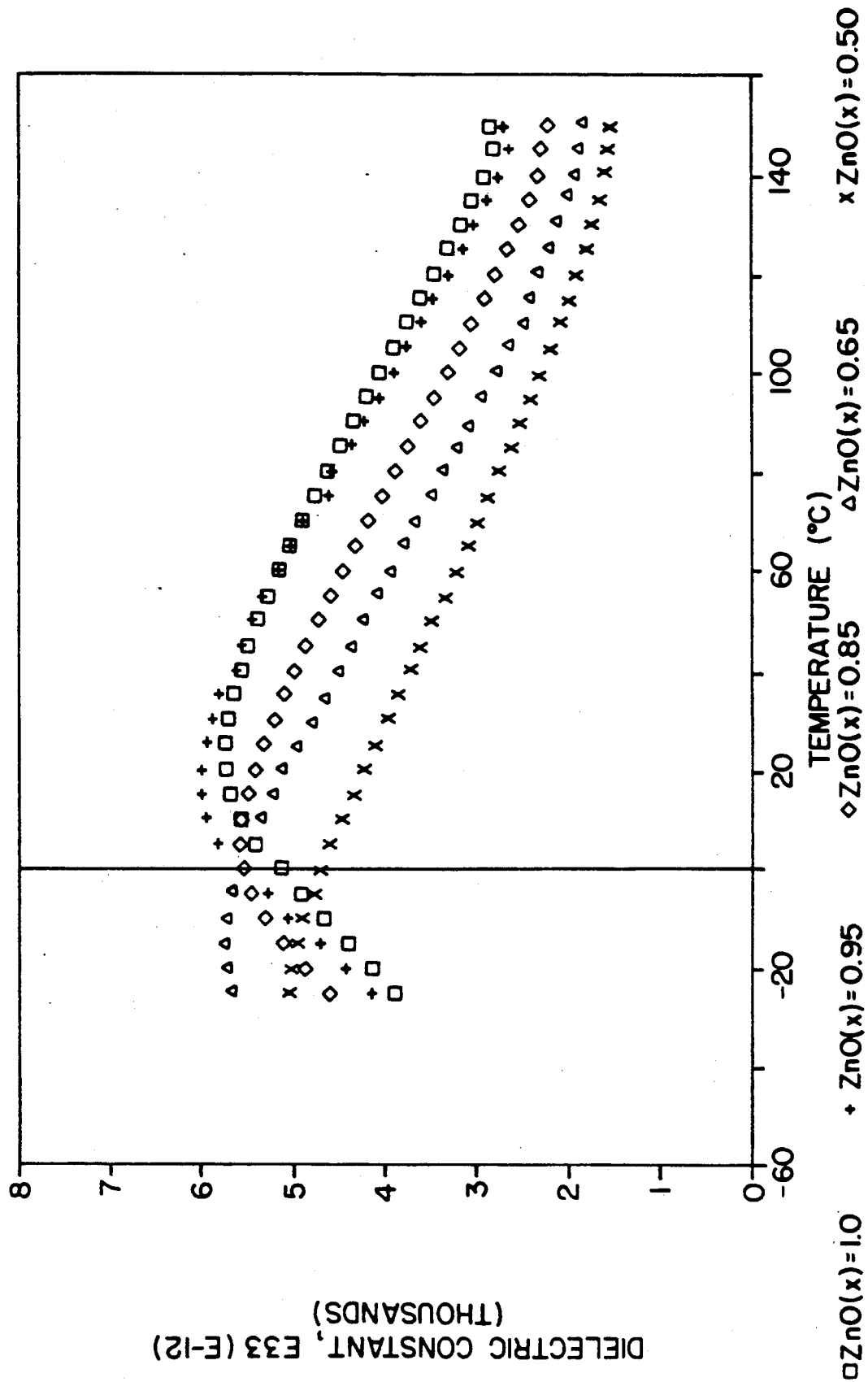
FIG. 3 illustrates the dielectric features of the product in accordance with FIG. 2.
Figure 4:
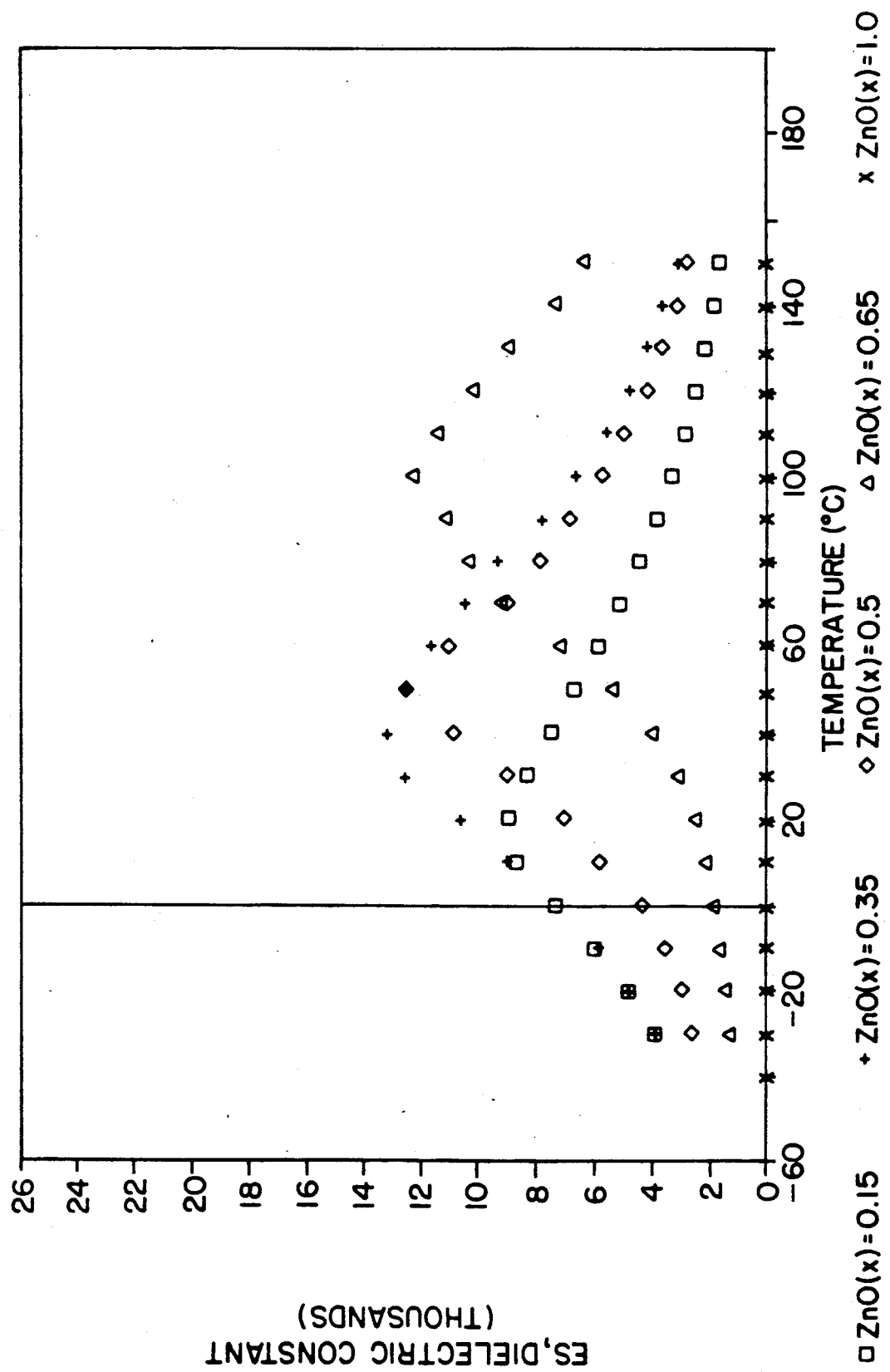
FIG. 4 illustrates the dielectric features of a sintered ceramics in a conventional method without the addition of SrTiO$_3$ whereas PbO, ZnO, MgO and Nb$_2$O$_5$ being mixed with an appropriate ratio, wherein the peak value of the dielectric coefficient is maximum at 13000.
Figure 5:
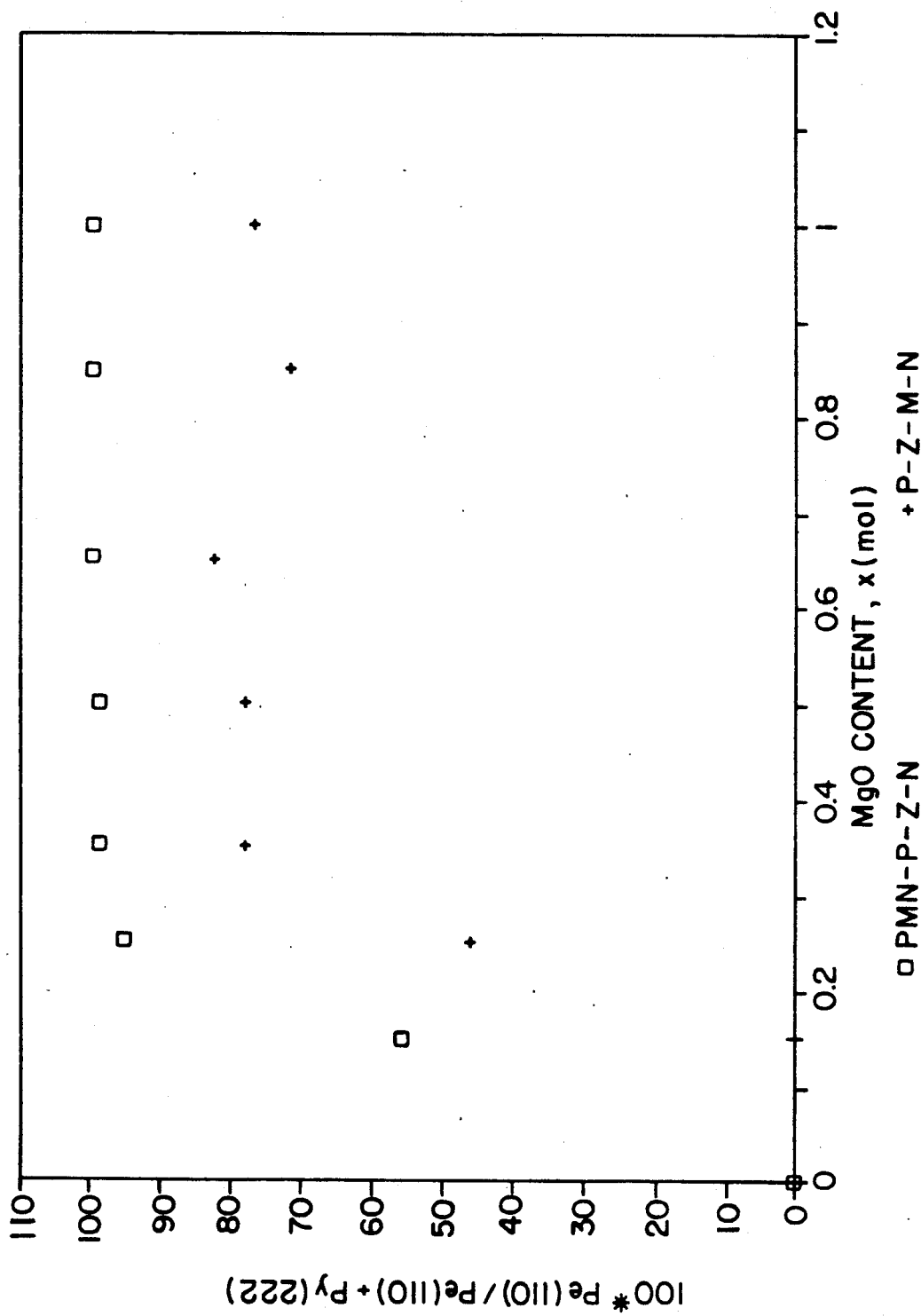
FIG. 5 illustrates the perovskite phase contents for the ceramics according to the present invention in comparison with the conventional method.

Referring to FIG. 5 which illustrates the perovskite phase contents for the ceramics according to the present invention in comparison with the conventional method. In the figure, curve PMN—P—Z—N indicates that when the amount of PMN ceramic added is greater than 25 mol %, a Pb[(Zn$_x$, Mg$_{1-x}$)$_{\frac{1}{3}}$Nb$_{\frac{2}{3}}$]O$_3$, where x is in the range from 0 to 0.75, ceramic material with almost 100% perovskite is obtained. On the other hand, in traditional P-Z-M-N curve, only when the amount of MgO exceeds 35 mol %, the obtained product Pb[$Zn_y$, $Mg_{1-y}$)$_\frac{1}{3}$$Nb_\frac{2}{3}$]$O_3$, y is between 0 and 0.65, possesses about 85% perovskite and no matter how much the amount of MgO is increased, to obtain a 100% perovskite is not possible. Thus, it is apparent that the preparation method in accordance with the present invention exceeds the extreme limitation of the traditional 85% perovskite phase and attains the highest efficacy of 100% perovskite. Moreover, merely 25% of the PMN is used which is comparatively less than that in the conventional method.

Figure 6:
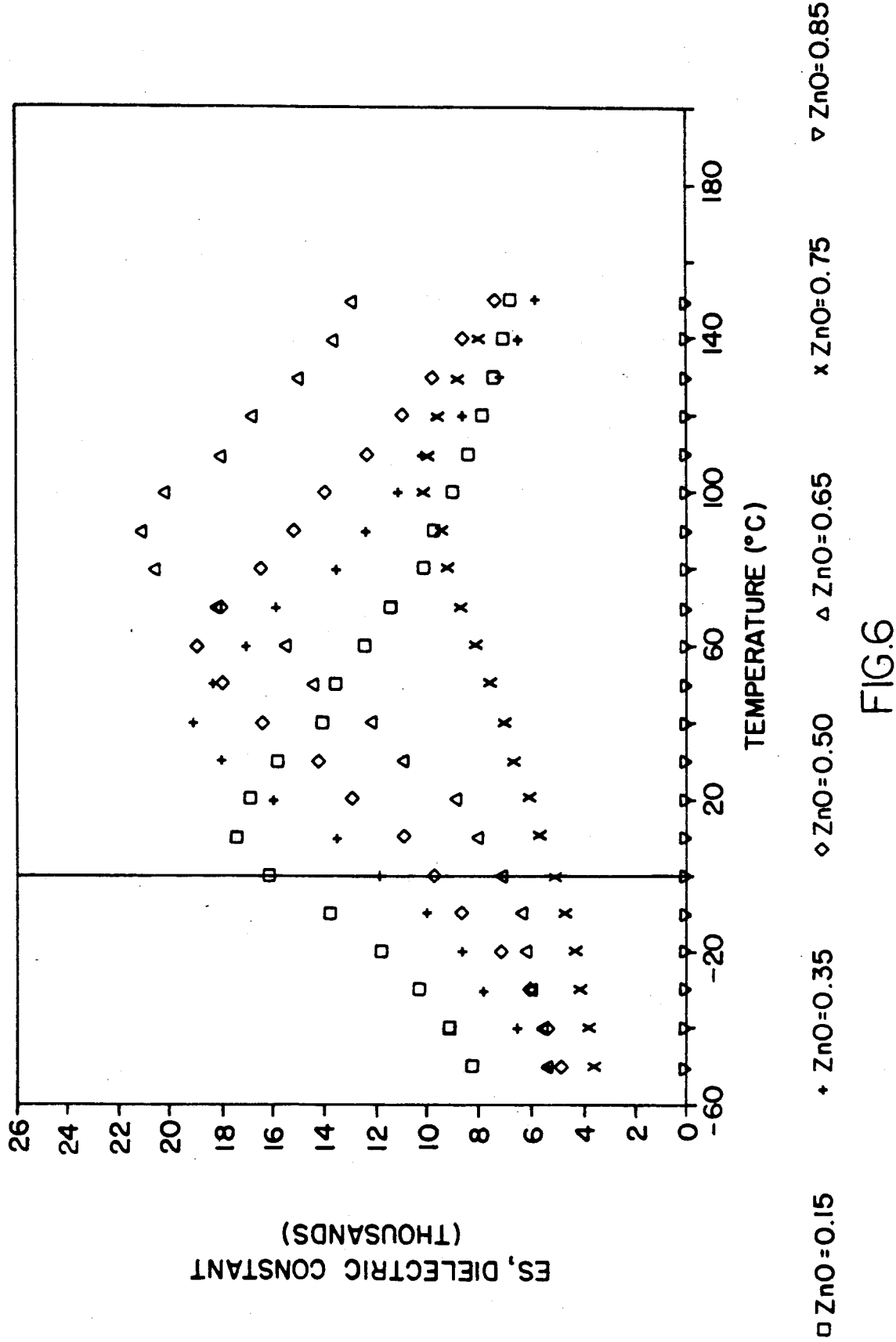
FIG. 6 illustrates the effect of ZnO on the Es (Dielectric Constant) and Tc of PZMN in accordance with the present invention.
Figure 7:
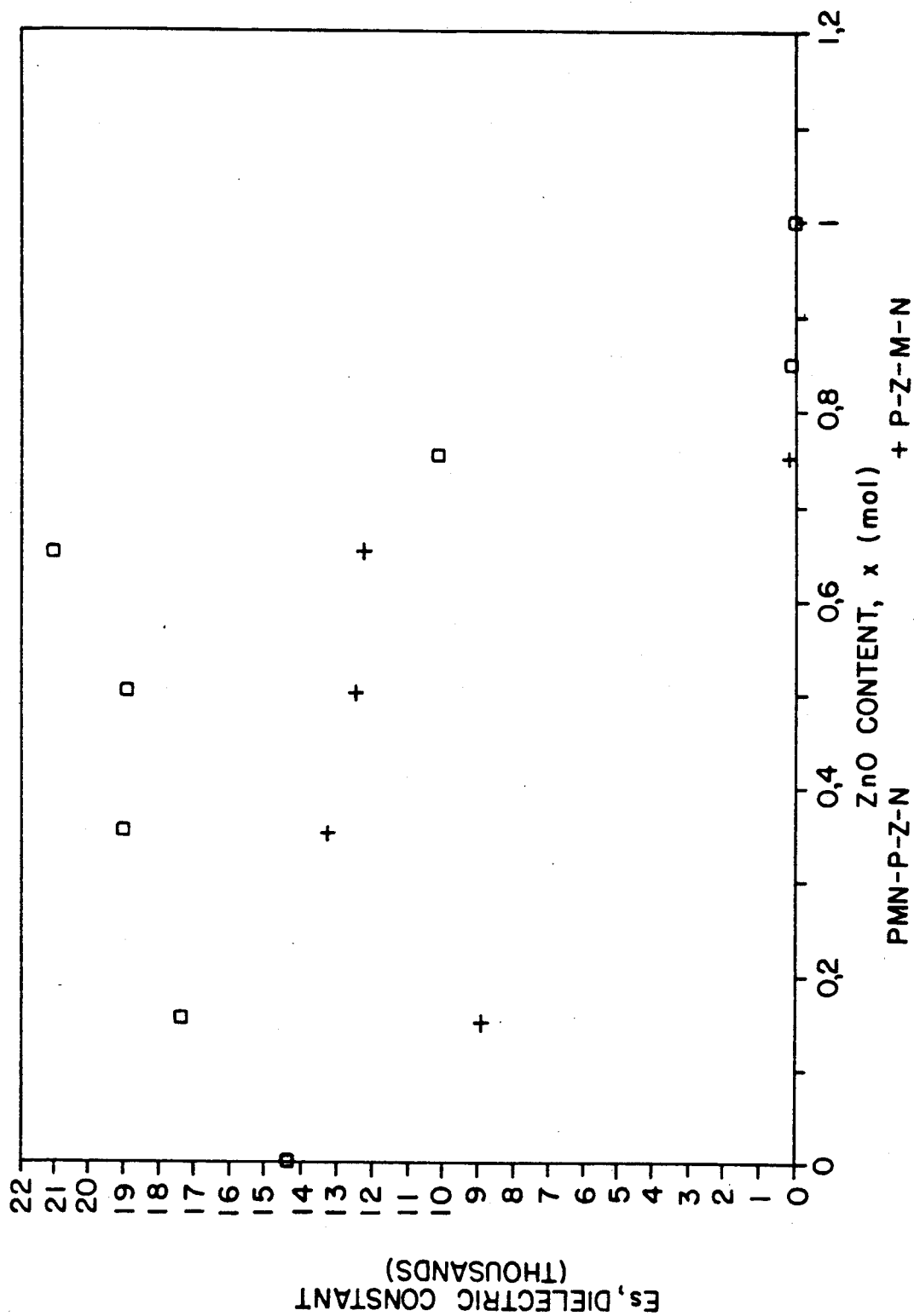
FIG. 7 illustrates the relationship between the dielectric constant and the amount of a ZnO in accordance with the present invention.

Referring to FIG. 6, which illustrates the effect of ZnO on the Es and Tc of PZMN in accordance with the present invention. The dielectric constant is varied with respect to x of Pb[($Zn_xMg_{1-x}$)$_\frac{1}{3}$$Nb_\frac{2}{3}$]$O_3$, wherein when x is equal to 0.65 (which has been denoted by Δ), the dielectric constant attains a maximum of $22 \times 10^3$. Referring to FIG. 7, which illustrates the relationship between the dielectric constant and the amount of ZnO in accordance with the present invention. In the figure, curve PMN—P—Z—N indicates that the dielectric constant is at a maximum of $22 \times 10^3$, which is a lot higher than that of the conventional P—Z—M—N of $12 \times 10^3$. Obviously, this further indicates the advantages and efficacies of the ceramic in accordance with the present invention.

The following example is offered by way of illustration. The example is not intended to be limiting to the scope of the invention in any respect and should not be so construed.

EXAMPLE

Example 1

13.736wt. % of MgO and 86.264 wt % of $Nb_2O_5$ were mixed ground and calcined at 1000° C. for 4 hours to form $MgNb_2O_6$ and 68.625 wt % of PbO was added to the above obtained product to form PMN perovskite phase of Pb($Mg_\frac{1}{3}Nb_\frac{2}{3}$)$O_3$. By making use of the PMN perovskite phase as a stabilizer, 43.419 wt. % of PbO, 5.2765 wt. % of ZnO, 17.2368 wt % of $Nb_2O_5$ and 34.0677 wt % of PMN were ground and mixed together in spirit. The product was dried at room temperature and calcined again at a temperature in the range of 850° C. to 950° C. for approximate 4 hours. Repeat the steps of grinding, and sintering the above obtained product at a temperature in the range of 950° C. to 1200° C. for about 2 hours. The final product according to this process is a Pb($Zn_{0.65}Mg_{0.35}$)$_\frac{1}{3}Nb_\frac{2}{3}O_3$ ceramic material with almost 100% perovskite.

From the foregoing it will be appreciated that, although specific embodiment of the invention has been described herein for purposes of illustration, various modifications may be made without deviating from the spirit and scope of the invention. Accordingly, the invention is not intended to be limited except as by the appended claims.

We claim:

1. A preparation method for Pb[($Zn_xMg_{1-x}$)$_\frac{1}{3}$$Nb_\frac{2}{3}$]$O_3$ ceramics comprising the steps of:
    (a) mixing about 14.0 wt % of MgO with 86.0 wt % of $Nb_2O_5$,
    (b) grinding and calcining the mixture obtained in step (a) at a temperature about 1000° C. for 4 hour,
    (c) reacting about 68.6 wt % PbO with the calcined product obtained in step (b), and then grinding and calcining at 900° C. 40h to from PMN [(Pb($Mg_\frac{1}{3}Nb_\frac{2}{3}$)$O_3$],
    (d) mixing about 10.2–49.8 wt % PbO, 1.2–6.0 wt % ZnO, and about 4.0–19.8 wt % $Nb_2O_5$ with about 84.4–24.2 wt % PMN [(PB($Mg_\frac{1}{3}Nb_\frac{2}{3}$)$O_3$] obtained in (c) carrying out the steps of grinding, drying and calcining at temperatures of 800° C. to 1200° C. for 4h, then sintering at temperatures of from 950°–1200° C. for 2hr, thereby Pb[($Zn_{1-x}Mg_x$)$_\frac{1}{3}$$Nb_\frac{2}{3}$]$O_3$ ceramic having almost 100% of perovskite phase is obtained.

2. A method of claim 1 for preparing a Pb[$Zn_xMg_{1-x}$)$_\frac{1}{3}$$Nb_\frac{2}{3}$)$O_3$ ceramic, wherein the value of x is up to 0.75.

3. A preparation method for Pb[($Zn_xMg_{1-x}$)$_\frac{1}{3}$$Nb_\frac{2}{3}$]$O_3$ ceramic, wherein the calcining temperatures are about 800° C. to 1200° C.

4. A product produced according to the method of claim 1 having a dielectric constant greater than about 15,000.

5. A product produced according to the method of claim 2 having a dielectric constant greater than about 15,000.

6. A product produced according to the method of claim 3 having a dielectric constant greater than about 15,000.

* * * * *